United States Patent
Lau et al.

(10) Patent No.: US 9,130,438 B2
(45) Date of Patent: *Sep. 8, 2015

(54) PERMANENT MAGNET MOTOR

(75) Inventors: James Ching Sik Lau, Hong Kong (CN); Chun Kit Cheung, Hong Kong (CN); Duncan Yiu Lung Wong, Hong Kong (CN)

(73) Assignee: JOHNSON ELECTRIC S.A., Murten (CH)

( * ) Notice: Subject to any disclaimer, the term of this patent is extended or adjusted under 35 U.S.C. 154(b) by 245 days.

This patent is subject to a terminal disclaimer.

(21) Appl. No.: 13/360,225

(22) Filed: Jan. 27, 2012

(65) Prior Publication Data

US 2012/0194022 A1 Aug. 2, 2012

(30) Foreign Application Priority Data

Jan. 27, 2011 (CN) .......................... 2011 1 0032957

(51) Int. Cl.
| | |
|---|---|
| *H02K 11/00* | (2006.01) |
| *H02K 13/00* | (2006.01) |
| *H02K 21/26* | (2006.01) |
| *H02K 11/02* | (2006.01) |
| *H02K 5/22* | (2006.01) |
| *H02K 23/30* | (2006.01) |

(52) U.S. Cl.
CPC .............. *H02K 11/026* (2013.01); *H02K 5/225* (2013.01); *H02K 23/30* (2013.01); *H02K 13/00* (2013.01); *H02K 21/26* (2013.01)

(58) Field of Classification Search
CPC .................. H02K 11/026; H02K 13/00–13/14
USPC ................................. 310/154.01, 239, 51, 71
See application file for complete search history.

(56) References Cited

U.S. PATENT DOCUMENTS

| | | | | |
|---|---|---|---|---|
| 4,673,837 | A | * | 6/1987 | Gingerich et al. ............. 310/239 |
| 5,231,322 | A | * | 7/1993 | Richards et al. ................ 310/51 |
| 5,949,173 | A | * | 9/1999 | Wille et al. .................... 310/220 |
| 7,084,547 | B2 | * | 8/2006 | Moroto et al. ................ 310/233 |
| 7,719,146 | B2 | * | 5/2010 | Takahashi et al. .............. 310/50 |

(Continued)

FOREIGN PATENT DOCUMENTS

| | | |
|---|---|---|
| JP | 2003189571 A | 7/2003 |
| JP | 2009095093 A | 4/2009 |

(Continued)

OTHER PUBLICATIONS

Machine Translation, Enami et al., JP 2009295340 A, Dec. 17, 2009.*

*Primary Examiner* — Thomas Truong
(74) *Attorney, Agent, or Firm* — Muncy, Geissler, Olds & Lower, P.C.

(57) ABSTRACT

An electric motor has a stator and a rotor rotatably installed in the stator. The stator includes a housing, a plurality of magnets installed at an inner surface of the housing, a brush card installed inside of the housing, brushes mounted on the brush card, lead wires for connecting to a power source and feeding power to the brushes, and an end cap attached to an end of the housing and covering the brushes. The rotor includes a shaft, a commutator fixed on the shaft, a rotor core fixed on the shaft and a winding wound on the rotor core and connected to the commutator. An EMI suppression component is mounted on the brush card and covered by the end cap, and the lead wires extends through the EMI suppression component.

18 Claims, 3 Drawing Sheets

(56) References Cited

U.S. PATENT DOCUMENTS

| | | | |
|---|---|---|---|
| 2008/0122303 A1* | 5/2008 | Santo et al. | 310/51 |
| 2009/0033159 A1* | 2/2009 | West et al. | 310/50 |
| 2010/0183460 A1* | 7/2010 | Qin et al. | 417/423.7 |
| 2012/0086297 A1* | 4/2012 | Makino | 310/203 |

FOREIGN PATENT DOCUMENTS

| | | | |
|---|---|---|---|
| JP | 2009295340 A | * 12/2009 | |
| JP | 2012-070512 A | 4/2012 | |
| WO | WO 2010137642 A1 | * 12/2010 | H02K 23/30 |

* cited by examiner

PERMANENT MAGNET MOTOR

CROSS REFERENCE TO RELATED APPLICATIONS

This non-provisional patent application claims priority under 35 U.S.C. §119(a) from Patent Application No. 201110032957.0 filed in The People's Republic of China on Jan. 27, 2011.

FIELD OF THE INVENTION

This invention relates to an electric motor and in particular, to a small electric motor which may be used for electrical appliances, such as power tools.

BACKGROUND OF THE INVENTION

Presently, the technology of portable power tools such as electric drills, power hammers, electric saws, electric wrenches, etc., is generally mature. A typical portable power tool comprises a casing, a motor, a gear train and a power head driven by the motor via the gear train.

To keep a portable power tool compact and for maximum force, there is a constant demand to reduce the size of the motor and to increase the output power.

Hence there is a desire for a motor which has a high power density.

SUMMARY OF THE INVENTION

Accordingly, in one aspect thereof, the present invention provides a permanent magnet motor comprising: a stator having a housing, a plurality of magnets installed at an inner surface of the housing, a brush card installed inside the housing, brushes mounted on the brush card, lead wires for connecting to a power source and feeding power to the brushes, and an end cap attached to an end of the housing and covering the brushes; and a rotor installed in the stator, the rotor comprising a shaft, a commutator fixed on the shaft, a rotor core fixed on the shaft and a winding wound on the rotor core and connected to the commutator, wherein the commutator comprises a plurality of segments for contacting with the brushes, the rotor core comprises a plurality of teeth, and the winding comprises a plurality of coils wound about the teeth with the ends of each coil being connected to two segments, and wherein in operation electrified coils are connected in parallel.

Preferably, each coil is wound about a single tooth.

Preferably, the stator comprises two brushes and conductors are connected between diagonally opposite segments of the commutator.

Preferably, the stator comprises four magnets and two brushes, the commutator has an even number of segments and conductors interconnect diagonally opposite segments of the commutator.

Preferably, the commutator comprises six segments and the winding comprises six coils.

Preferably, a ring EMI suppression component is mounted on the brush card and covered by the end cap, and the lead wires extend through the ring EMI suppression component.

Preferably, the EMI suppression component is a ferrite ring.

According to a second aspect, the present invention also provides a permanent magnet motor which comprises a stator and a rotor installed in the stator. The stator comprises a housing, a plurality of magnets installed at an inner surface of the housing, a brush card installed inside of the housing, brushes mounted on the brush card, lead wires for connecting to a power source and feeding power to the brushes, and an end cap attached to an end of the housing and covering the brushes. The rotor comprises a shaft, a commutator fixed on the shaft, a rotor core fixed on the shaft and a winding wound on the rotor core and connected to the commutator. An EMI suppression component is mounted on the brush card and covered by the end cap, and the lead wires extend through the EMI suppression component to outside of the motor.

The present invention further provides a power tool comprising a casing, a motor installed in the casing, a gear train installed in the casing, and a power head driven by the motor via the gear train, wherein the motor is a motor as described above.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

The preferred embodiment of the present invention will be described with reference to FIGS. 1 to 6. It should be understood that the power tool according to the present invention can be a power drill, power hammer, electric saw, electric wrench, etc. A portable power drill will be used hereafter to explain the invention by way of example only.

Figure 1:
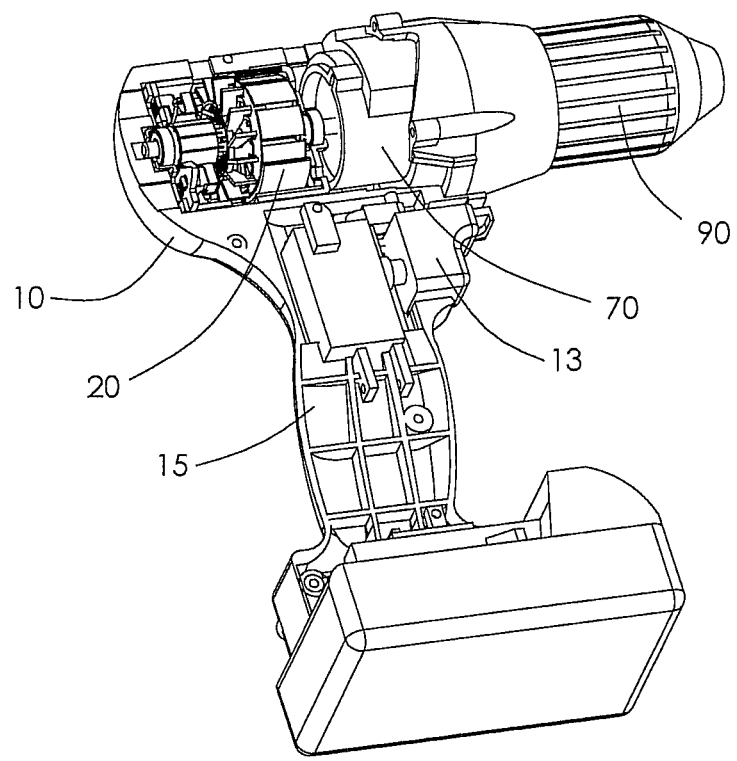
FIG. 1 is a partial sectional view of a portable power drill.
Figure 4:
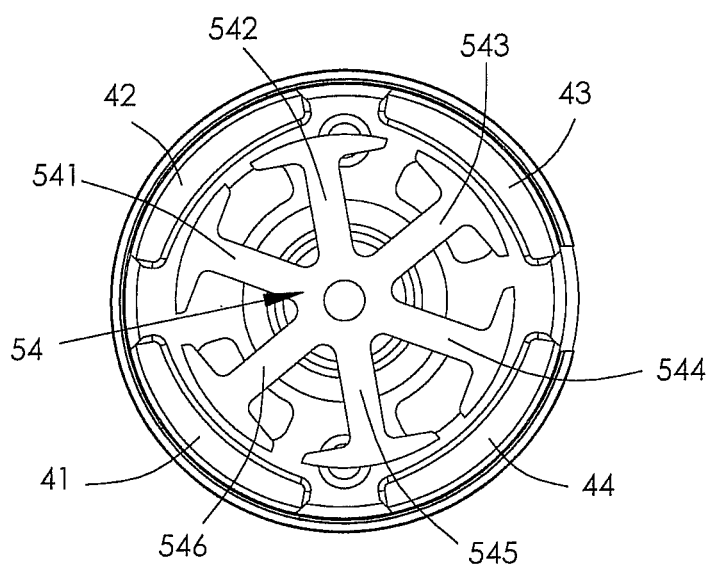
FIG. 4 is a cross sectional view of the motor of FIG. 2.
Figure 2:
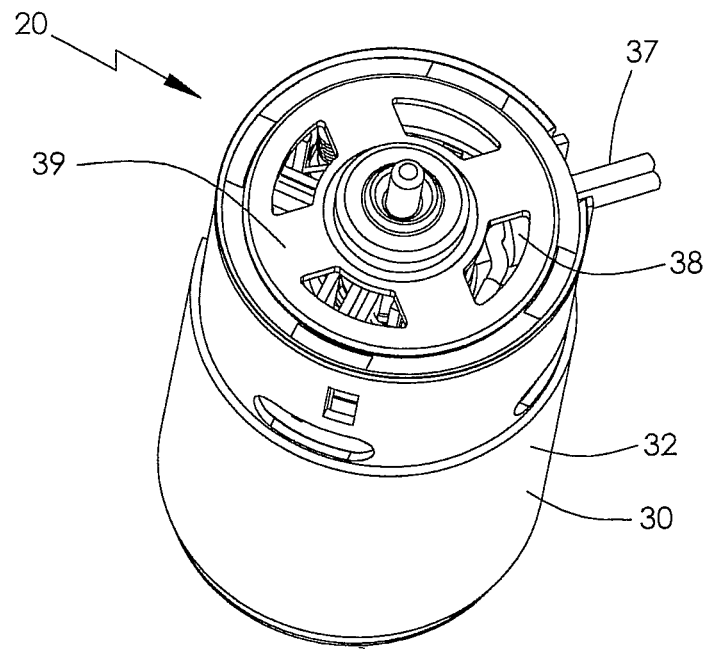
FIG. 2 illustrates an electric motor in accordance with a preferred embodiment of the present invention, as used in the drill of FIG. 1.
Figure 3:
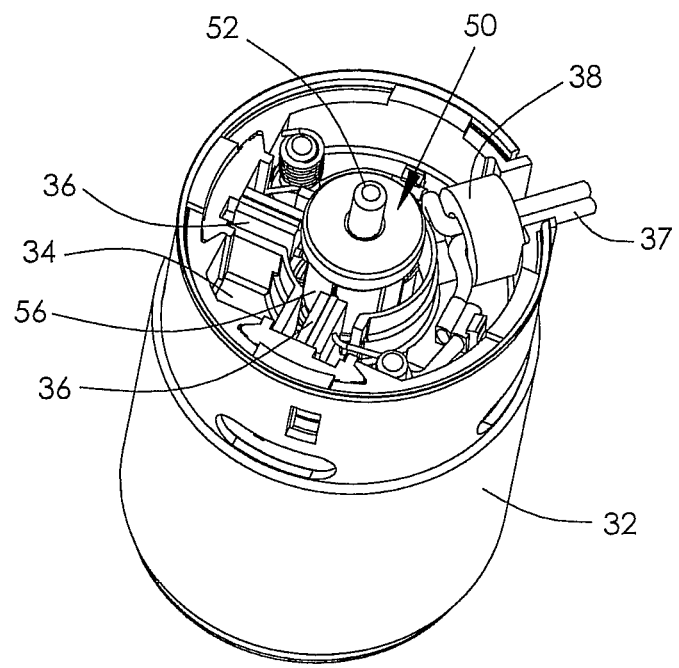
FIG. 3 illustrates the motor of FIG. 2 with an end cap thereof removed.

As shown in FIG. 1, the power tool comprises a casing 10, a motor 20 and a gear train 70 installed in the casing 10, and a power head 90 driven by the motor 20 via the gear train 70. In this embodiment, the power tool is a portable power drill and the power head 90 is a chuck for holding drill bits. Operation of the tool is manually controlled by pressing a switch 13 located on a handle 15 of the casing.

The motor 20 is a permanent magnet motor which comprises a stator 30 and a rotor 50 rotatably mounted relative to the stator 30. The stator 30 comprises a housing 32, a brush card 34 installed inside the housing 32, brushes 36 and an EMI suppression component 38 installed on the brush card 34. The housing 32 has a cylindrical configuration with a closed end and an open end opposite to the closed end. The brush card 34 is installed inside the housing 32 near the open end, for installing the brushes 36 and electronic components such as chokes thereon.

The stator 30 further comprises a pair of lead wires 37 configured for connecting a power source to the brushes 36 to thereby feed power to the brushes 36. In this embodiment, the EMI suppression component 38 is a ferrite ring 38. The lead wires 37 extend through the ferrite ring 38 before passing outside of the housing 32. The stator 30 further comprises an end cap 39 fixed to the open end of the housing 32 and covering the brushes 36 and the ferrite ring 38, and other electronic components.

The rotor 50 comprises a shaft 52, a rotor core 54 fixed to the shaft 52, a commutator 56 fixed to the shaft 52 and a winding formed by coils 581~586 wound on the rotor core 54 and connected to the commutator 56. The brushes 36 slidably contact the commutator 56 for providing power to the winding via the commutator.

Figure 5:
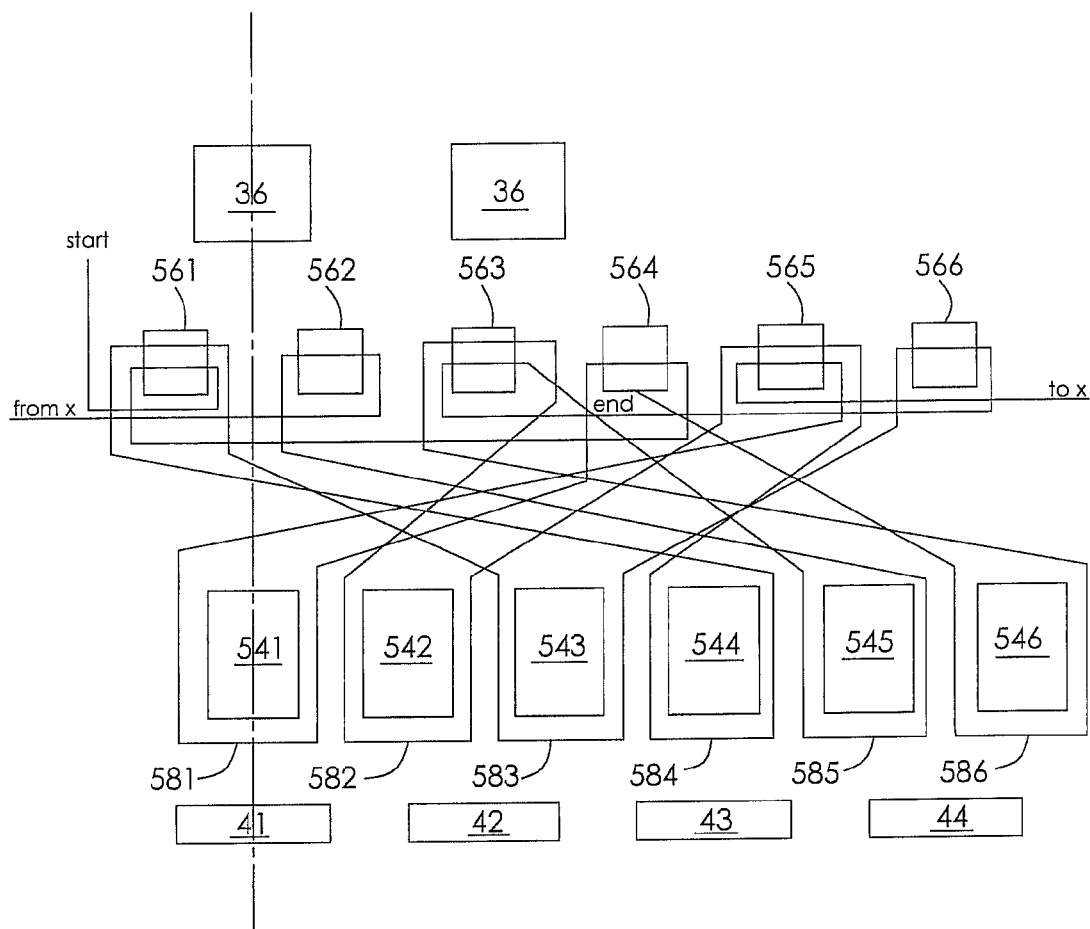
FIG. 5 illustrates a winding diagram showing the winding, commutator segments, brushes, and magnets of the motor.

As shown in FIG. 5, the commutator 56 comprises a plurality of segments 561~566 that make contact with the brushes 34. The rotor core 54 comprises a plurality of teeth 541~546 and each of the coils 581~586 are wound about a respective tooth. Two ends of each coil 581~586 are respectively connected to two of the segments 561~566. The stator 30 further comprises a plurality of permanent magnetic poles 41~44 around the rotor core 54 and the coils 581~586.

In this embodiment, the stator comprises four magnet poles 41~44 formed by four permanent magnets, there are two brushes 36, the commutator comprises six segments 561~566, and the winding comprises six coils 581~586. The coils 581~586 are wound by a wire as follows.

The start of the wire is connected to the segment 561 and the wire is then connected to the segment 564 to form a conductor between the segments 561 and 564. The wire is then wound about the tooth 541 with a plurality of turns to form the coil 581. Thus, one end of the coil 581 is connected to the segment 564.

The other end of the coil 581 is connected to the segment 565 and the wire is then connected to the segment 562 to form a conductor between the segments 565 and 562. The wire is then wound about the tooth 545 with a plurality of turns to form the coil 585. Thus, one end of the coil 585 is connected to the segment 562.

The other end of the coil 585 is connected to the segment 563 and the wire is then connected to the segment 566 to form a conductor between the segments 563 and 566. The wire is then wound on the tooth 543 with a plurality of turns to form the coil 583. Thus, one end of the coil 583 is connected to the segment 566.

The other end of the coil 583 is connected to the segment 561. The wire is then wound on the tooth 544 with a plurality of turns to form the coil 584. Thus, one end of the coil 584 is connected to the segment 561.

The other end of the coil 584 is connected to the segment 565. The wire is then wound on the tooth 542 with a plurality of turns to form the coil 582. Thus, one end of the coil 582 is connected to the segment 565.

The other end of the coil 582 is connected to the segment 563. The wire is then wound on the tooth 546 with a plurality of turns to form the coil 586. Thus, one end of the coil 586 is connected to the segment 563. The other end of the coil 586 is connected to the segment 564, where the wire is terminated.

Figure 6:
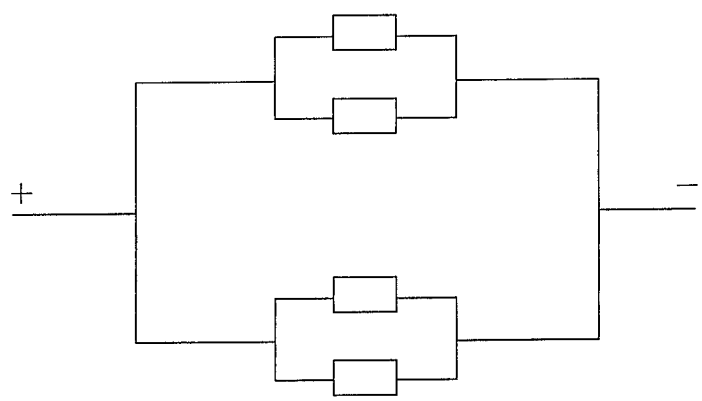
FIG. 6 illustrates four electrified coils of the winding of the motor connected in parallel.

Thus, in operation, the brushes 36 contact the segments 561~566 in turn, to sequentially energize respective groups of four coils connected in parallel, as shown in FIG. 6. Every block in FIG. 6 represents a coil. The four coils of each group being simultaneously electrified.

In the present invention, ferrite ring 38 is disposed inside of the motor housing 32 and does not occupy space outside of the motor. Compared to a traditional motor with the coils connected in series, the coils of the present invention may be wound by a thinner wire as the coils are connected in parallel and the current flowing through each coil is therefore reduced. It is easier to wind a thinner wire than a thicker wire. Four magnet poles are used. The power density is increased compared to a traditional power tool motor with only two magnet poles.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

The invention claimed is:

1. A permanent magnet motor comprising:
   a stator having a housing, a plurality of magnets installed at an inner surface of the housing, a brush card installed inside the housing, brushes mounted on the brush card, more than one lead wires connected to the brushes and configured for connecting to a power source to thereby feed power to the brushes, and an end cap attached to an end of the housing and covering the brushes; and
   a rotor installed in the stator, the rotor comprising a shaft, a commutator fixed on the shaft, a rotor core fixed on the shaft and a winding wound on the rotor core and connected to the commutator,
   wherein a single EMI (electromagnetic interference) suppression component is mounted on the brush card and covered by the end cap, and said more than one lead wires extend through the single EMI suppression component, and
   wherein the housing of the stator defines a cutout at the end thereof, the single EMI suppression component has a through hole facing the cutout of the housing, said more than one lead wires extending to outside of the housing after passing through the hole and the cutout successively.

2. The motor of claim 1, wherein the commutator comprises a plurality of segments for contacting with the brushes, the rotor core comprises a plurality of teeth, and the winding comprises a plurality of coils wound about the teeth and opposite ends of each coil are connected to two segments such that in operation electrified coils are connected in parallel.

3. The motor of claim 2, wherein each coil is wound about a single tooth.

4. The motor of claim 2, wherein the commutator comprises six segments and the winding comprises six coils.

5. The motor of claim 2, wherein the plurality of magnets comprises four magnets, the plurality of brushes comprise two brushes, and the commutator has an even number of segments and conductors interconnect diagonally opposite segments of the commutator.

6. The motor of claim 1, wherein the EMI suppression component is a ferrite ring.

7. A power tool comprising a casing, a motor installed in the casing, a gear train installed in the casing, and a power head driven by the motor via the gear train, wherein the motor is the motor of claim 1.

8. The motor of claim 1, wherein the EMI suppression component has a ring shape, and the brushes and the ring-shaped EMI suppression component are arranged on the brush card in a circumferential direction of the brush card and spaced from each other in the circumferential direction.

9. The motor of claim 1, wherein the winding comprises coils, and the coils are wound by a continuous wire.

10. A permanent magnet motor comprising:
a stator having a housing, a plurality of magnets installed at an inner surface of the housing, a brush card installed inside the housing, two brushes mounted on the brush card, lead wires for connecting to a power source and feeding power to the brushes, and an end cap attached to an end of the housing and covering the brushes, the brushes being disposed in a space axially formed between the end cap and the brush card; and
a rotor installed in the stator, the rotor comprising a shaft, a commutator fixed on the shaft, a rotor core fixed on the shaft and a winding wound on the rotor core and connected to the commutator,
wherein the commutator comprises a plurality of segments for contacting with the brushes, the rotor core comprises a plurality of teeth, and the winding comprises a plurality of coils each wound on the same tooth/teeth and opposite ends of each coil being connected to two segments such that in operation electrified coils are connected in parallel and opposite ends of each electrified coil are electrically connected to corresponding brushes without another coil connected there between, and
wherein conductors interconnect diagonally opposite segments of the commutator, the coils and the conductors being formed by a continuous wire,
wherein the two brushes are mounted on the brush card at a side of the commutator and an EMI (electromagnetic interference) suppression component is mounted on the brush card at an opposite side of the commutator, the two brushes and the EMI suppression component being respectively arranged at three branches of a Y shape, the lead wires extending through the EMI suppression component along one of the three branches of the Y shape.

11. The motor of claim 10, wherein each coil is wound about a single tooth.

12. The motor of claim 10, wherein the commutator comprises six segments and the winding comprises six coils.

13. The motor of claim 10, wherein conductors are connected between corresponding segments of the commutator.

14. The motor of claim 10, wherein the plurality of magnets comprise four magnets, and the commutator has an even number of segments.

15. The motor of claim 10, wherein the EMI suppression component is a ring EMI suppression component.

16. The motor of claim 15, wherein the EMI suppression component is a ferrite ring.

17. The motor of claim 15, wherein the housing of the stator defines a cutout at the end thereof and the ring EMI suppression component has a through hole, the lead wire extending to outside of the housing after passing through the hole and the cutout successively.

18. A power tool comprising a casing, a motor installed in the casing, a gear train installed in the casing, and a power head driven by the motor via the gear train, wherein the motor is the motor of claim 10.

* * * * *